(12) United States Patent
Gofman et al.

(10) Patent No.: US 6,456,822 B1
(45) Date of Patent: Sep. 24, 2002

(54) ELECTRONIC DEVICE AND METHOD FOR BLOCKING CELLULAR COMMUNICATION

(75) Inventors: Yossef Gofman, Tel Aviv; Ofer Yarden-Zaslavsky, Moshav Olesh, both of (IL)

(73) Assignee: Netline Communications Technologies (NCT), Ltd., Tel Aviv (IL)

( * ) Notice: Subject to any disclaimer, the term of this patent is extended or adjusted under 35 U.S.C. 154(b) by 0 days.

(21) Appl. No.: 08/977,605

(22) Filed: Nov. 25, 1997

(30) Foreign Application Priority Data

Nov. 26, 1996 (IL) .................................................. 119694

(51) Int. Cl.⁷ ................................................ H04B 1/38
(52) U.S. Cl. .............................. 455/1; 455/456; 455/63; 455/67.3
(58) Field of Search .................................. 455/515, 163, 455/67.3, 422, 434, 456, 457

(56) References Cited

U.S. PATENT DOCUMENTS

| | | | |
|---|---|---|---|
| 3,942,179 A | | 3/1976 | Dorn |
| 4,217,550 A | * | 8/1980 | Biassel et al. ................. 455/1 |
| 4,901,307 A | | 2/1990 | Gilhousen et al. |
| 5,001,771 A | * | 3/1991 | New ............................... 455/1 |
| 5,142,695 A | | 8/1992 | Roberts et al. |
| 5,224,150 A | * | 6/1993 | Neustein ...................... 455/70 |
| 5,295,180 A | | 3/1994 | Vendetti et al. |
| 5,367,269 A | * | 11/1994 | Yanagidaira et al. ........... 455/1 |
| 5,404,391 A | | 4/1995 | Wavroch et al. |
| 5,428,667 A | | 6/1995 | Easterling et al. |
| 5,428,668 A | | 6/1995 | Dent et al. |
| 5,596,570 A | | 1/1997 | Soliman |
| 5,670,742 A | | 9/1997 | Jones |
| 5,774,787 A | * | 6/1998 | Leopolp et al. ................ 455/63 |
| 6,085,096 A | * | 7/2000 | Nakamura ................... 455/456 |

FOREIGN PATENT DOCUMENTS

| | | | |
|---|---|---|---|
| DE | 2727734 A1 | * | 1/1979 |
| DE | 2240213 C2 | * | 4/1982 |
| GB | 2186466 A | * | 8/1987 |

OTHER PUBLICATIONS

Robinson, M.P. et al.; "Interference to medical equipment from mobile phones"; Journal of Medical Engineering & Technology; vol. 21; Nos. 3–4; pp. 141–146; May–Aug. 1997.

Teitelbaum, S.; Cellular Obsessions, Wired Magazine; vol. 5; No. 1; Jan. 1997 (http://www.wired.com/wired/archive/5.01/ffisraeli_pr.html—pp. 1–8).

* cited by examiner

Primary Examiner—Thanh Cong Le
(74) Attorney, Agent, or Firm—Fenster & Company Patent Attorneys, Ltd.

(57) ABSTRACT

A method and device for achieving reliable prevention of cellular telephone calls, within a given area. In the preferred embodiment, the device and method operate to block the control frequencies of the cellular system within a given area. The device broadcasts a blocking signal with a low power output, which interferes with the reception ability and decoding of signals and commands broadcast at the control frequency. Thus, the handshake routine of the telephone/cellular subscriber with the local cellular system is prevented. Operation of the device is achieved in several ways, manually, automatically, and/or by remote control. Its operation prevents cellular communication ability by subscribers within the area or within the effective blocking range, which is derived from the effective radiated power (ERP) of the blocking signal, its type and the type of communications/or blocked system. Using the inventive device, a given area normally accessible by cellular communications is blocked from such access, thus providing a security-related, cultural or other safeguard. The given area is thereby isolated from cellular communications, and access can only be achieved by physically relocating the user of a blocked cellular telephone.

21 Claims, 3 Drawing Sheets

ELECTRONIC DEVICE AND METHOD FOR BLOCKING CELLULAR COMMUNICATION

FIELD OF THE INVENTION

The present invention relates to cellular telephone communications and accessories therefor, and more particularly, to an electronic device for blocking cellular communications in a designated space, such as public institutions, theaters, etc.

BACKGROUND OF THE INVENTION

The proliferation of portable cellular telephones has given rise to a new cultural phenomena, visible and audible in many social settings, and public gathering places, institutions, and the like—ringing wireless telephones and open conversations. Depending on the locale and the type of setting, this phenomena has become an intrusion at best, and at worst, it has become very annoying to others engaging in quiet discourse, or seeking peace.

Therefore, there is a recognized need for a device which will prevent the ability to establish a cellular telephone conversation, either received or initiated, in a given area. This need derives from security-related, cultural and other norms.

Cellular communications are provided by mobile telephones in vehicles, or by personal cellular systems (PCS) and by multiple cell networks. Several different methods exist for establishing cellular communications, with differences in frequency range, modulation, signal processing, compression, bandwidth, demodulation and signal detection, etc.

Examples of existing cellular communication methods include:

AMPS/TACS—Analog
NAMPS/NTACS—Narrow AMPS/TACS (IS 91/88)
TDMA—Time Division Multiple Access (IS 54/136)
GSM—Global System Mobile (IS 95)
CDMA—Code Division Multiple Access
FDMA—Frequeny Division Multiple Access The frequencies of operation of some of these methods are listed in the attachment drawing Table 1.

The common denominator in all of these methods and techniques is based on predetermined control frequencies, to which the cellular units are directed or "listen" automatically, while they are in the standby mode. The control is two-way full duplex, such that there are a plurality of forward control channels (FCC) from the cell to the portable unit (uplink), and a plurality of reverse control channels (RCC) from the telephone to the cell (downlink). A maximum of three channels are assigned to each cell or sector. The cellular units automatically adjust to the best of these channels available in the cell or sector.

There are two possibilities in establishing a cellular conversation:

1) The subscriber initiates a conversation (origination)—the user initiates a conversation from the cellular unit to any telephone subscriber. In this case, he dials the destination subscriber number and presses the send button, and this begins a handshake routine opposite the local cellular cell, which provides service in a given area. The call handling is then passed to an area cellular mobile telephone switch office (MTSO), which checks the information, performs a verification that the subscriber is operating properly, and is entitled to receive service and then connects to the destination subscriber. This process is known as "call setup".

2) The subscriber receives a conversation (page)—the cellular system receives a request to establish a conversation with a cellular subscriber, and the area cellular MTSO performs a subscriber locate/search activity by sending a "search call" to all the cellular cells (connected to it) and these broadcast it on their control frequencies.

The destination subscribers (when in a standby mode) which are tuned to the local control frequency, respond to the search call and this begins a handshake routine with the area cellular MTSO. When finished, the system assigns a pair of specific frequencies, a forward control channel (FCC) from the cell to the portable unit, and a reverse control channel (RCC) from the telephone to the cell, in full duplex mode, to which the telephone and cell are tuned. Only after this, a ring command is broadcast to the telephone, activating the cellular subscriber's ringing unit, and this clears the way for a full conversation.

A basic condition in establishing any cellular conversation is that the control frequency and the service in a given area are received by the subscriber with a volume which provides a required signal-to-noise ratio (S/N) or better. Clearly, this condition is also true concerning the receiver equipment at the cellular cell, that is, that the information transmitted by the subscriber is received with the required S/N ratio, or better.

As described above, there exists a need for a device which will prevent the ability to establish a cellular telephone conversation, either received or initiated, in a given area. Various reasons exist for this requirement, and these may be security-related, cultural, moral etc. For example, prevention of a cellular conversation on military bases is a classic security requirement. The same requirement exists in a theater, as a cultural norm in different countries.

Therefore, it would be desirable to provide a device for preventing the establishment of cellular telephone conversations in a given area, for various reasons.

SUMMARY OF THE INVENTION

Accordingly, it is a principal object of the present invention to provide a method and device for achieving reliable prevention of cellular telephone calls, within a given area.

In accordance with a preferred embodiment of the present invention, there is provided a method for prevention of cellular telephone calls in a communication system within a given area, said method comprising the steps of:

determining at least one control frequency existing within the area for establishing cellular telephone calls, said control frequency containing information transmitted thereon, said information being transmitted as coded signals and commands; and generating a signal which interferes with said control frequency by preventing decoding of said signals and commands, said signal preventing generation of handshake signals in the systems to prevent establishment of a cellular phone call.

In the preferred embodiment, the device and method operate to block the control frequencies of the cellular system within a given area. The device broadcasts a blocking signal with a low power output, which interferes with the reception ability and decoding of signals and commands broadcast at the control frequency. Thus, the handshake routine of the telephone/cellular subscriber with the local cellular system is prevented.

Operation of the device is achieved in several ways, manually, automatically, and/or by remote control. Its operation prevents cellular communication ability by subscribers within the area or within the effective blocking range, which is derived from the effective radiated power (ERP) of the blocking signal, its type and the type of communications/or blocked system.

Using the Inventive device, a given area normally accessible by cellular communications is blocked from such access, thus providing a security-related, cultural or other safeguard. The given area is thereby isolated from cellular communications, and access can only be achieved by physically relocating the user whose cellular telephone has been blocked.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

Table 1 lists the frequencies of operation of existing cellular communication methods; and Table 2 lists the cellular system control frequencies.

DETAILED DESCRIPTION OF THE PREFERRED EMBODIMENTS

Figure 1:
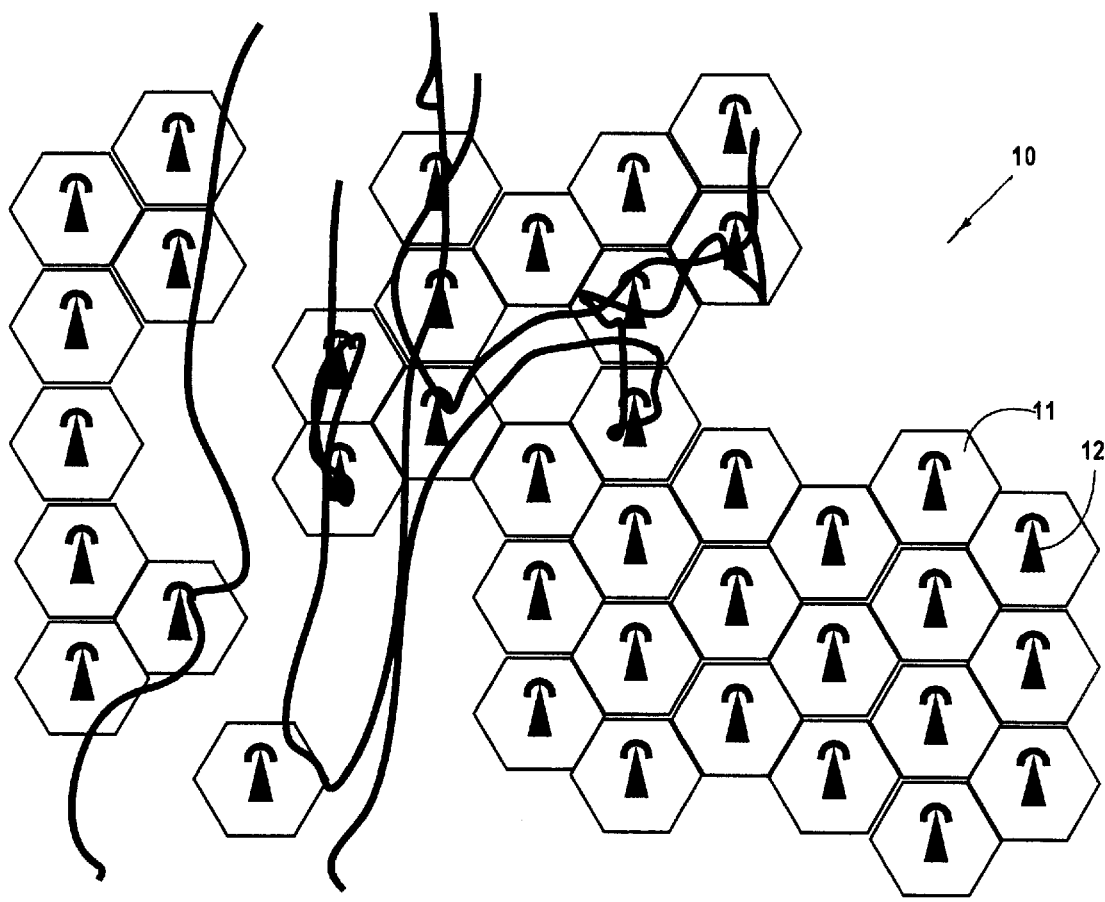
FIG. 1 is a schematic diagram of a cellular communications system architecture in a geographic region.

Referring now to FIG. 1, there is shown a schematic diagram of a cellular communications system 10 architecture superimposed over a geographic area represented by a map. Such architecture is common in the art, and this approach allows a number of low-power transmitters to create many small cellular regions 11, each serviced by a cellular communications station 12. As is known in the art, a cellular phone call can be established either by a subscriber who initiates a conversation (origination), or by a subscriber who receives (page) a conversation. In each case, a control frequency is used to begin a handshake routine opposite the local cellular cell, which provides service in a given area.

If the call is initiated by the subscriber, the call handling is passed to an area cellular MTSO, which checks the information, performs a verification that the subscriber is operating properly, and is entitled to receive service and then connects to the destination subscriber. This process is known as "call setup".

If the call is received by the subscriber, the cellular system receives a request to establish a conversation with a cellular subscriber, and the area cellular MTSO performs a subscriber locate/search activity by sending a "search call" to all the cellular cells (connected to it) and these broadcast it on their control frequencies. After a handshake routine ends in response to a search call, the system assigns a pair of specific frequencies, a forward control channel (FCC) from the cell to the portable unit, and a reverse control channel (RCC) from the telephone to the cell, in full duplex mode, to which the telephone and cell are tuned. The cellular subscriber's ringing unit is then activated, and a full phone conversation can begin.

Figure 2:
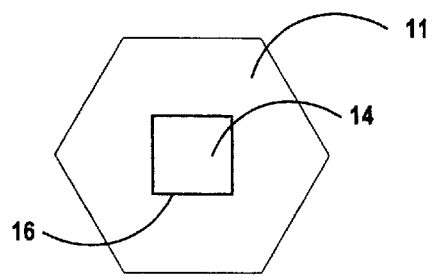
FIG. 2 is a schematic diagram of a blocked area.

In FIG. 2, there is shown a schematic diagram of a blocked area 14 within a cellular communication system, in which the electronic blocking device 15 of the present invention is located, for blocking cellular phone calls to this area. The perimeter of this area 14 is typically a building wall 16, or a fence, or some visible demarcation, enabling users of cellular telephones to distinguish between permitted and blocked areas, so that they are aware of the borders within which cellular phone calls are inaccessible. However, even though signs may be posted notifying users of restricted cellular phone call access, such notification is of secondary importance. This is because the inventive concept is to block such access, whether or not the user is aware of the restriction imposed within a designated area.

Figure 3:
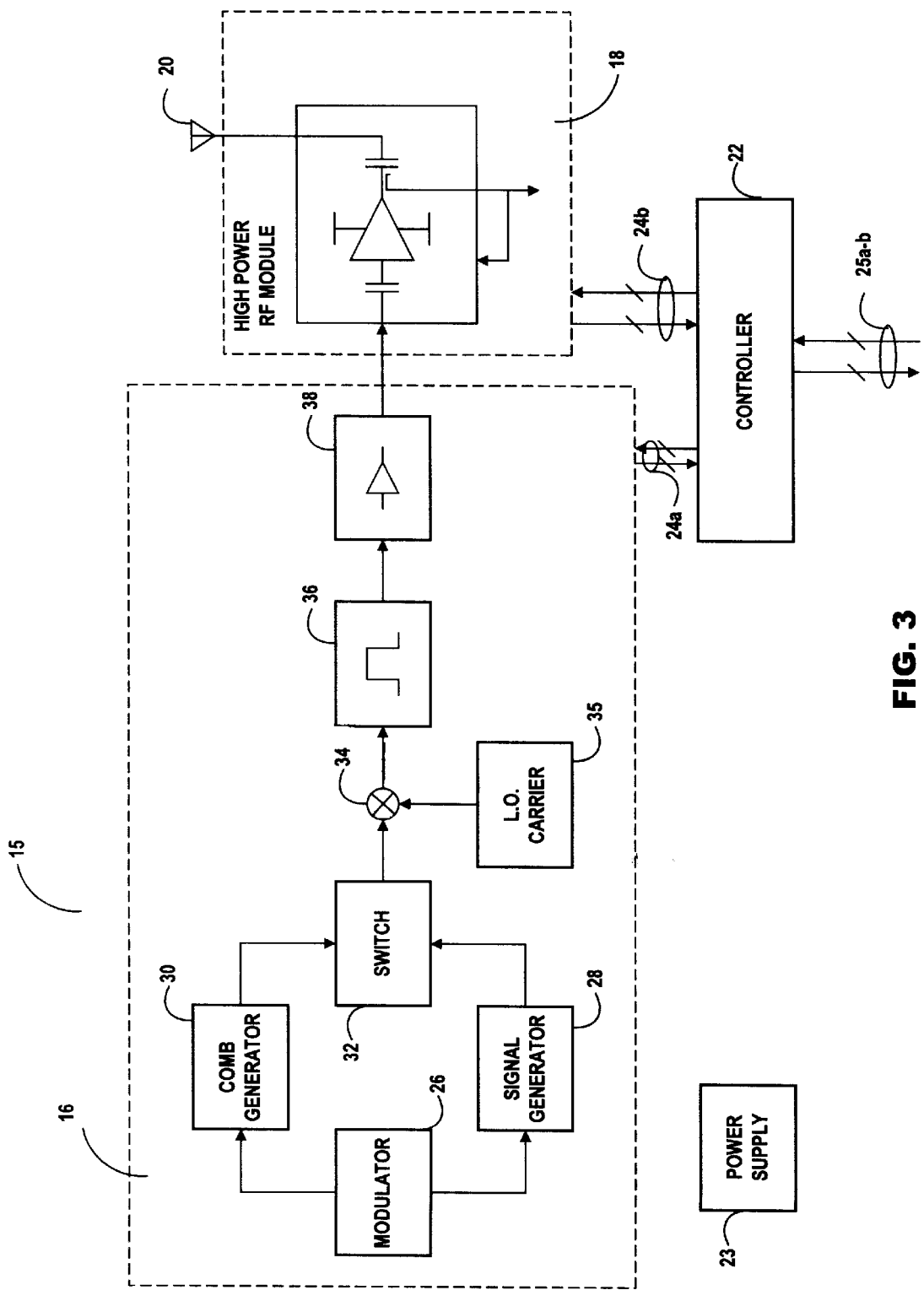
FIG. 3 is an electronic schematic block diagram of a preferred embodiment of a device for preventing cellular phone calls in the area of FIG. 2.

Referring now to FIG. 3, there is shown an electronic schematic block diagram of an electronic device 15 constructed and operated in accordance with the principles of the present invention, for preventing cellular phone calls in a given area. Device 15 provides a shaped signal in the spectral frequency range of the relevant control signal frequencies of the cellular system. The blocking signal matches the range of control frequencies, and the chosen method of blocking system operation.

Device 15 comprises a low-power signal oscillator 16, for generating a blocking signal, and a high-power RF module 18 for transmitting the blocking signal on the RF frequencies desired, via an antenna 20, which is matched to the proper frequency range. A controller 22 controls the modules described above, provides indicator signals and receives remote commands. Specifically, controller 22 controls the operation of the signal oscillator 16 and the transmitter 18, respectively, via control signals 24a–b. Controller 22 receives external handshake signals 25a and provides indicator signals 25b for external use. Device 15 can be constructed in accordance with skill of the art electronic design techniques, for operation as a low-power, non-FCC licensed device. A power supply 23 supplies circuit power.

Signal oscillator 16 comprises a modulator 26, a voltage controlled oscillator (VCO) 28, a signal frequency comb oscillator 30 or bandwidth oscillator, a switch 32, a mixer 34, a multiplier 35, a signal filter 36 and an output amplifier 38.

As stated above, the chosen method of blocking the cellular system operation determines the operation of device 15. For example, if a continuous blocking signal on a single control frequency is chosen, modulator 26 is inoperative and VCO 28 generates a signal (within the VCO limitations), which matches the bandwidth of a single control frequency. This signal is forwarded via switch 32 to mixer 34, where it is multiplied by the local oscillator in multiplier 35, to raise it to the required frequency. Signal filter 36 removes unwanted frequencies from the mixer 34 output, and a signal at the chosen blocking frequency is received. Output amplifier 38 amplifies the blocking signal before it is fed to transmitter 18. The blocking signal interferes with the control frequency, to prevent cellular calls.

Another method of blocking cellular system operation is to operate device 15 such that a modulated noise signal is produced. In this approach, modulator 26 operates to feed VCO 28 which produces a modulated noise signal. There are two types of noise signals available in this approach:

1) Analog noise—modulator 26 can be implemented by an electronic component which emits thermal noise, such as a noisy diode or noisy resistance. The signal is fed to and amplified by amplifier stages (transistors/operational amplifiers), producing a voltage signal which is amplitudemodulated by the noise. The bandwidth of the noise must be greater than that of the control signal channel bandwidth. For example, for a TDMA/AMPS cellular system, the noise bandwidth must be greater than 15 KHz.

2) Digital noise—modulator 26 is implemented as an electronic component which generates random bits, with a bit rate greater than that of data transmitted on the control channel, which for a TDMA/AMPS system, is a bit rate greater than 10 KB/s.

An additional method of blocking cellular system operation is to operate device 15 so as to produce a continuous blocking signal on all of the control frequencies of the cellular system. In this method, switch 32 selects the signal frequency comb oscillator 30 output, as a wide bandwidth oscillator, covering all of the control frequency spectrum (see Table 2).

For example, in the B frequency range for a TDMA/AMPS type of cellular system having a re-use factor of 7, the frequency range is (MHz) 880.020, 880.050, 880.080, 880.110, 008.140, etc. In total, 21 frequencies are involved, from 880.020 MHz up to 880.620 MHz, and the comb oscillator 30 output is a wide bandwidth, greater than 600 KHz.

In another additional method of blocking cellular system operation, device 15 is operated to produce a continuous blocking signal on a selected group of control frequencies. In this case, switch 32 selects the signal frequency comb oscillator 30 output, as a sweep of frequencies. This signal is assembled from multiple predetermined frequencies in simultaneous fashion (see Table 2). A set of frequencies intended for blocking is chosen from all the possible frequencies of the blocked system.

Still another additional method of blocking cellular system operation involves operating device 15 as in the previous methods, with modulator 26 applying modulation to the blocking technique. The blocking signal generated by signal oscillator 16 feeds the input to transmitter 18, which amplifies it and broadcasts it to the atmosphere by antenna 20. Transmitter 18 is based on a linear amplification module operating in the RF range of the cellular frequencies, enabling control of the transmitter power output. The amplifier has a transmission power output of 0.1 watt continuous, appropriate heat dissipation and a dynamic output power range of at least 30 db.

The antenna 20 must be matched to the area to be blocked and the location as required. For example, blocking in a single room can be achieved by a flat antenna 20 installed in the ceiling. In the case of a long corridor, the blocking could be achieved by use of a leaky coax cable for the antenna 20, etc.

In the previously described embodiments, the set of frequencies intended for blocking is chosen from all the possible frequencies of the system, and these control frequencies are generally known. If this information is not available, a scan receiver and computer can be used in a known method to determine the control frequencies active in a given system. This method requires placement of the scan receiver in the field location of interest, and this presents difficulties in certain situations.

Figure 4:
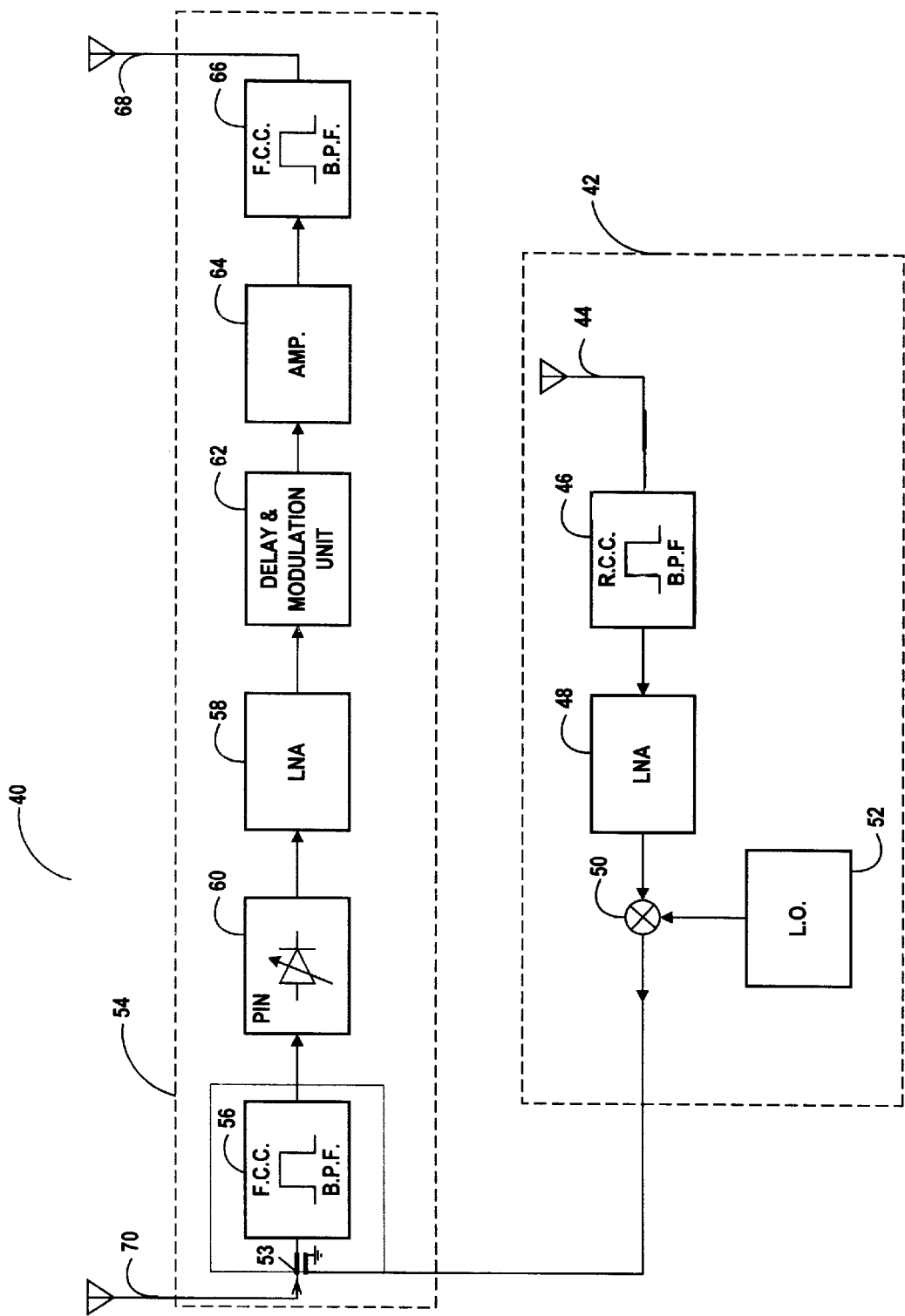
FIG. 4 is an electronic schematic block diagram of an alternative embodiment of a cellular phone call prevention device.

Referring now to FIG. 4, there is shown an electronic device 40 featuring an alternative embodiment designed in accordance with the principles of the present invention, for preventing cellular phone calls in a given area. This embodiment requires no prior knowledge of the system control frequencies.

Instead, a control frequency of the cellular subscriber's unit is detected during a handshake attempt and a frequency mixing technique is used to generate the matching duplex control frequency at which the cellular cell operates. The generated duplex signal induces open loop oscillations which interfere with the decoding procedure and introduces phase noise.

As shown, device 40 comprises a combined receiver/transmitter, with receiver portion 42 comprising an antenna 44, filter 46, pre-amplifier 48, and frequency mixer 50, which is fed with a frequency signal from a local oscillator 52. The frequency generated by local oscillator 52 is predetermined to be at the exact frequency deviation between the duplex frequencies of the reverse control channel (RCC) and forward control channel (FCC). For example, as per TDMA Standard IS-36, the frequency deviation between RCC and FCC frequencies should be 45.000 MHz. Thus, the output of mixer 50 consists of four different frequencies, one of them being the exact FCC frequency matching the duplex RCC frequency initially received by antenna 44.

The mixer 50 output is coupled via a coupler 53 to the transmitter portion 54 of device 40. Transmitter portion 54 comprises a bandpass filter 56 which passes only the FCC frequency to a pre-amplifier 58, via a threshold circuit 60. The output is then fed to a delay and modulation unit 62, after which an amplifier 64 feeds the output to a bandpass filter 66, with its output signal being broadcast via matched antenna 68.

The broadcast signal is received by another antenna 70, which is matched to the FCC frequency. If the loop gain, i.e., the gain applied to the FCC signal received through antenna 70, until it is re-broadcast on antenna 68, is equal to or greater than the isolation between the antennas 68–70, then an unstable oscillation is developed, at the FCC frequency, due to positive feedback. This interferes with decoding and introduces phase noise in the cellular subscriber's unit, causing the handshake routine to malfunction, thus blocking cellular system operation.

Using the embodiment of FIG. 4, another method of blocking cellular system operation is by operating local oscillator 52 so as to modulate the received FCC signal with 15 KKz, for example. This causes the broadcast of an amplified, modulated signal at the same FCC frequency, however, containing a component of phase noise which interferes with decoding in the cellular subscriber's unit.

Having described the invention with regard to certain specific embodiments, it is to be understood that the description is not meant as a limitation, since further modifications may now become apparent to those skilled in the art, and it is intended to cover such modifications as fall within the scope of the appended claims.

We claim:

1. A method for prevention of cellular telephone calls in a cellular communication system within a given area, said method comprising:

determining a plurality of control frequency existing within the area for establishing cellular telephone calls, said at least one control frequency containing information thereon, said information being transmitted as coded signals and commands; and generating an interference signal which interferes with said at least one control frequency by preventing decoding of said signals and commands, said interference signal preventing generation of handshake signals in the system, to prevent establishment of a cellular phone call with a portable cellular telephone, wherein said interference signal is generated continuously on said at least one control frequency; and wherein generating comprises mixing said determined control frequency with a predetermined frequency to develop a phase modulated signal, wherein the interference signal blocks decoding of a forward control channel signal by introducing phase noise in said portable cellular telephone.

2. The method of claim 1 wherein said at least one control frequency comprises at least one forward control channel (FCC) providing communications from the cellular communication system to a portable cellular telephone.

3. The method of claim 1 wherein said at least one control frequency comprises at least one reverse control channel (RCC) providing communications from a portable cellular telephone to the cellular communication system.

4. The method of claim 1 wherein said at least one control frequency comprises a single frequency.

5. The method of claim 1 wherein said at least one control frequency comprises a range of relevant control frequencies.

6. The method of claim 1 wherein said at least one control frequency comprises a plurality of control frequencies selected from a range of relevant control frequencies.

7. The method of claim 1 wherein said interference signal is generated with analog noise.

8. The method of claim 1 wherein said interference signal is generated with digital noise.

9. The method of claim 1 wherein said interference signal is generated continuously on a plurality of control frequencies.

10. The method of claim 1 wherein said interference signal is modulated.

11. A device for prevention of cellular telephone calls in a communication system within a given area, said device comprising:

means for determining at least one control frequency existing within the given area for establishing cellular telephone calls, said control frequency containing information transmitted thereon, said information being transmitted as coded signals and commands; and means for generating a signal which interferes with said control frequency by preventing decoding of said signals and commands, said signal preventing generation of handshake signals in the system, to prevent establishment of a cellular telephone call, wherein said means for generating comprises a mixer for mixing said determined control frequency with a predetermined frequency to develop a phase modulated signal, which blocks decoding of a forward control channel signal by introducing phase noise in said portable cellular telephone.

12. The device of claim 11 wherein said control frequency is a forward control channel (FCC) providing communications from the cellular communication system to a portable cellular telephone.

13. The device of claim 11 wherein said control frequency is a reverse control channel (RCC) providing communications from a portable cellular telephone to the cellular communication system.

14. The device of claim 11 wherein said at least one control frequency comprises a single frequency.

15. The device of claim 11 wherein said control frequency comprises a range of relevant control frequencies.

16. The device of claim 11 wherein said control frequency is a set of control frequencies selected from a range of relevant control frequencies.

17. The device of claim 11 wherein said means for generating comprises a mixer for mixing said determined control frequency with a predetermined frequency to develop a phase modulated signal, which blocks decoding of a forward control channel signal by introducing phase noise in said portable cellular telephone.

18. A method for prevention of cellular telephone calls in a cellular communication system within a given area, said method comprising:

determining control frequencies existing within the area for establishing cellular telephone calls, said frequencies containing information thereon, said information being transmitted as coded signals and commands; and generating an interference signal which interferes with said control frequencies by preventing decoding of said signals and commands, said interference signal preventing generation of handshake signals in the system, to prevent establishment of a cellular phone call with a portable cellular telephone, wherein said interference signal is generated simultaneously on a plurality of said control frequencies.

19. A device for prevention of cellular telephone calls in a communication system within a given area, said device comprising:

means for determining at least one control frequency existing within the given area for establishing cellular telephone calls, said control frequency containing information transmitted thereon, said information being transmitted as coded signals and commands; and means for generating a signal which interferes with said control frequency by preventing decoding of said signals and commands, said signal preventing generation of handshake signals in the system, to prevent establishment of a cellular telephone call, wherein said means for generating comprises a mixer for mixing said determined control frequency with a frequency representing the deviation between duplex forward and reverse control channel frequencies, thereby developing an unstable positive feedback in one of said control channel frequencies, and blocking decoding by introducing phase noise in said portable cellular telephone.

20. A device according to claim 19 wherein said control frequency is a forward control channel (FCC) providing communications from the cellular communication system to a portable cellular telephone.

21. A device according to claim 19 wherein said control frequency is a reverse control channel (RCC) providing communications from a portable cellular telephone to a cellular communications system.

* * * * *